United States Patent [19]

Morgan, Jr.

[11] Patent Number: 5,514,275
[45] Date of Patent: May 7, 1996

[54] SMOOTH WALL FILTER VESSEL AND LINER

[76] Inventor: H. William Morgan, Jr., P.O. Box 735, Michigan City, Ind. 46361

[21] Appl. No.: 341,354

[22] Filed: Nov. 17, 1994

[51] Int. Cl.$^6$ .................................................. B01D 29/27
[52] U.S. Cl. ........................ 210/448; 210/452; 210/484
[58] Field of Search ..................... 210/484, 485, 210/448, 451, 452, 416.1

[56] References Cited

U.S. PATENT DOCUMENTS

| | | | |
|---|---|---|---|
| 1,581,089 | 4/1926 | Roberts | 210/380.1 |
| 1,726,758 | 9/1929 | Olson | 210/484 |
| 2,028,168 | 1/1936 | Roberts | 210/484 |
| 3,122,501 | 2/1964 | Hultgren | 210/451 |
| 3,771,664 | 11/1973 | Schrink et al. | 210/484 |
| 4,390,425 | 6/1983 | Tafara et al. | 210/448 |
| 4,505,816 | 3/1985 | Wozniak et al. | 210/484 |
| 5,376,271 | 12/1994 | Morgan, Jr. | 210/452 |

Primary Examiner—Peter A. Hruskoci
Assistant Examiner—Theodore M. Green
Attorney, Agent, or Firm—Baker & Daniels

[57] ABSTRACT

A filtering device for filtering a liquid includes a vessel having an inlet and outlet communicating with a chamber found within the vessel. A flexible, liquid permeable filtering bag is suspended within the chamber and receives liquid from the inlet, which is filtered by passing through the walls of the bag. The bag is supported away from the wall of the vessel by a liner which extends circumferentially around the bag and is provided with apertures for communicating liquid through the liner. Radially outwardly extending projections extend from the solid portion of the liner which define the apertures and engage the wall of the chamber to maintain the circumferentially extending portion of the liner to a predetermined distance from the wall of the vessel. Accordingly, passages around and over the projections are defined to thereby permit liquid fluid to communicate between the vessel and the liner to the outlet.

8 Claims, 3 Drawing Sheets

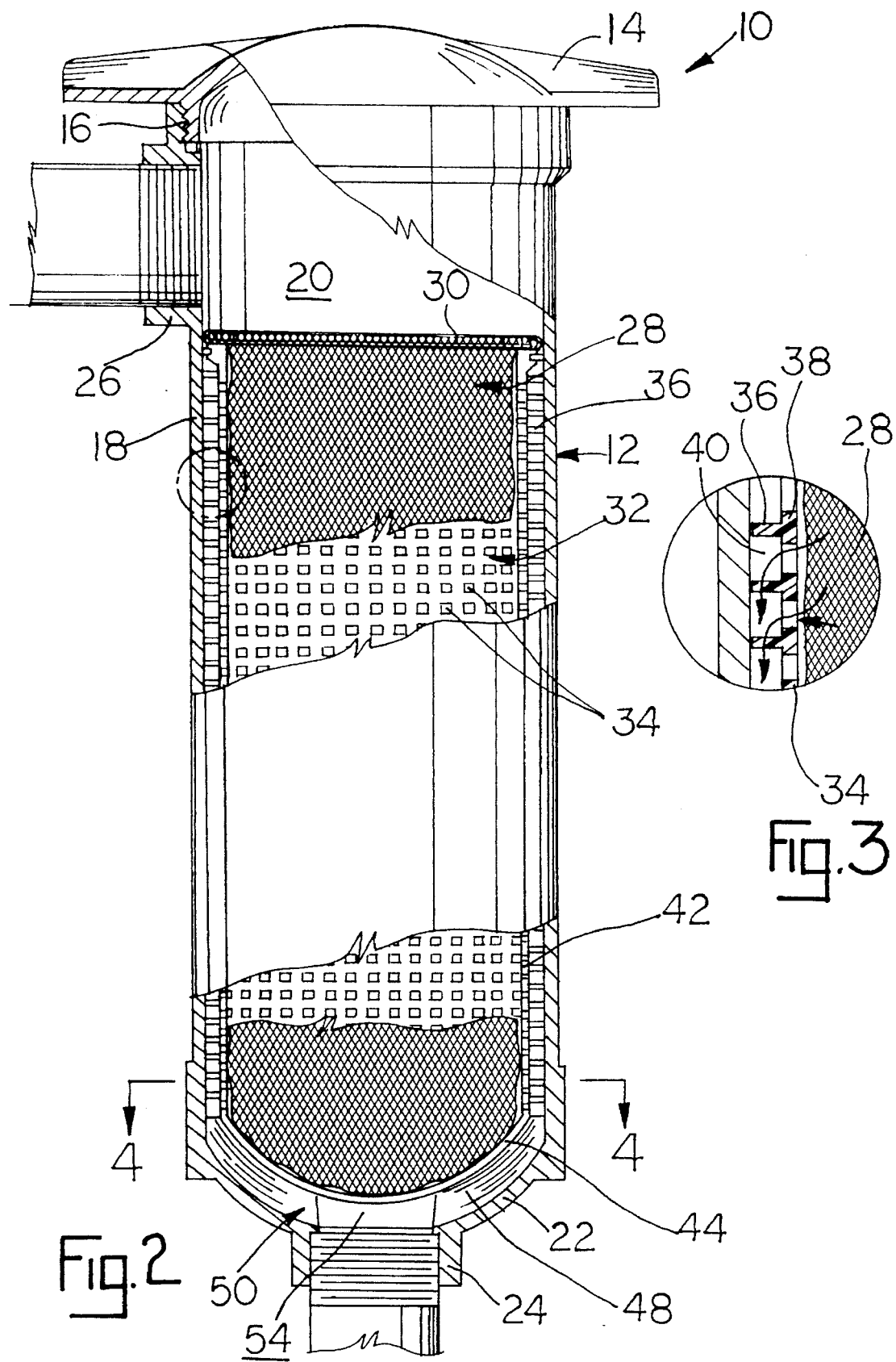

SMOOTH WALL FILTER VESSEL AND LINER

This invention relates to a filtering device for filtering liquids.

Large filtering vessels are commonly used for filtering industrial chemicals, such as solvents, cleaning fluids, etc. A filtering bag is suspended within the vessel and is fluid permeable such that solid matter too large to pass through the pore in the filtering bag is retained therein while the liquid passes through the filtering bag through the outlet of the vessel.

According to the present invention, an apertured liner circumscribes the bag and supports the bag within the vessel away from the circumferentially extending walls of the vessel so that a liquid that has passed through the bag may drain to the outlet through the passages defined between the liner and the wall. The liner has raised outwardly extending projections which project from the solid portions of the lining between the apertures and which engage the wall of the vessels to support the liner at a predetermined distance from the wall of the vessel, thereby assuring an open passage through which fluid may drain to the outlets around the vessel. Because of the liner, the filtering bag is supported away from the vessel wall permitting a smooth wall vessel to be used. Furthermore, because of the projections, the liner may be made thinner than would be otherwise be possible, thus providing more room within the vessel to accommodate the bag. A support provided on the bottom of the vessel supports the liner off of the bottom so that liquid may drain to the outlet. Although the outlet is shown in the figures at the bottom of the vessel, the outlet may be placed at any point on the wall of the vessel such that fluid may communicate to the outlet after having passed through the bag.

These and other advantages of the present invention become apparent from the following description, with reference to the accompanying drawings.

BRIEF DESCRIPTION OF DRAWINGS

FIG. 2 is a side elevational view, partly in cross section, of the filtering vessel illustrated in FIG. 1;

FIG. 3 is an enlarged detail view of the circumscribed portion of FIG. 2; and

Figure 1:
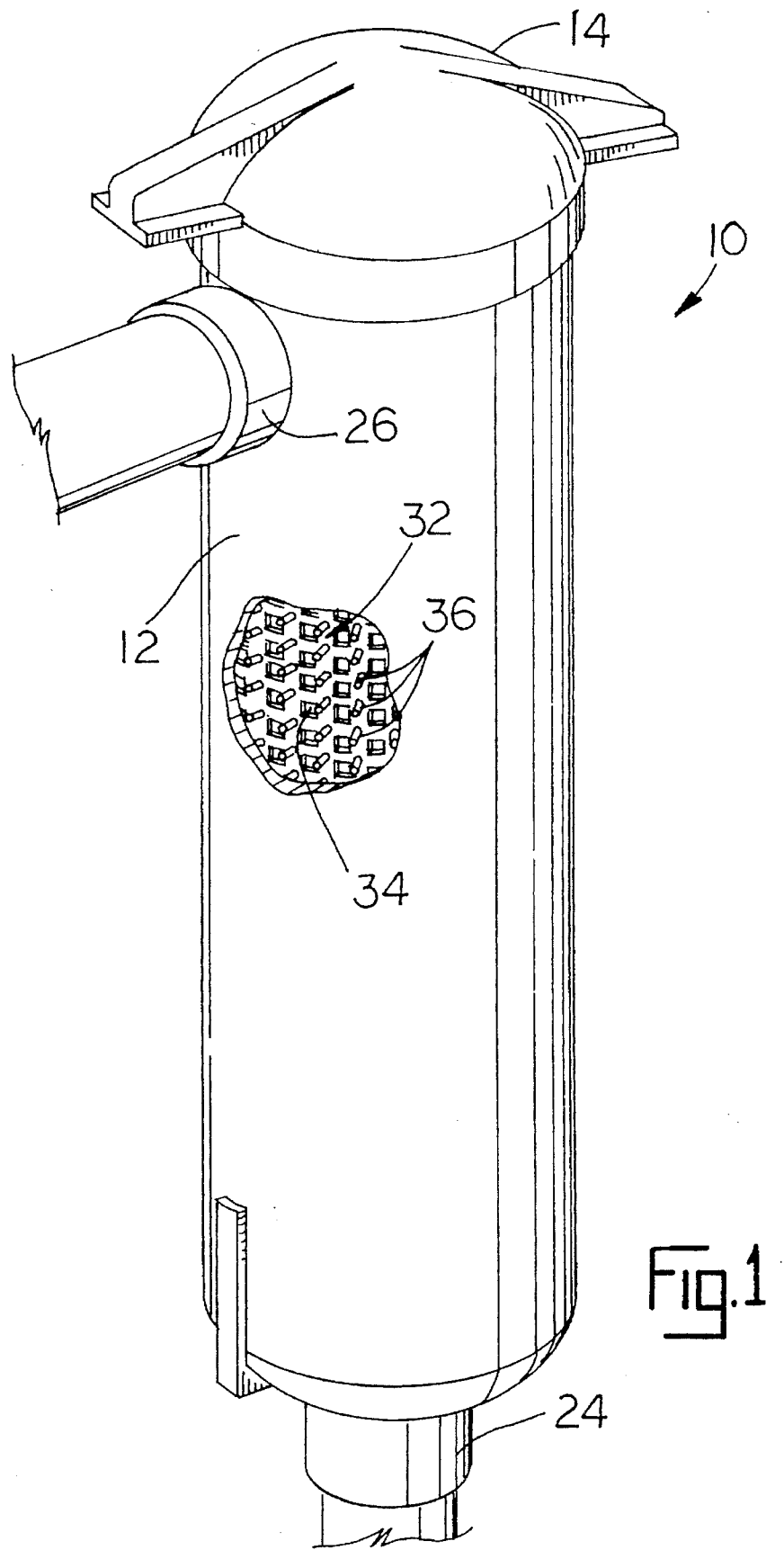
FIG. 1 is a perspective view of a filtering vessel made pursuant to the teaching of the present invention, with a portion of a wall thereof being broken away to illustrate the outer circumferential surface of the liner.
Figure 4:
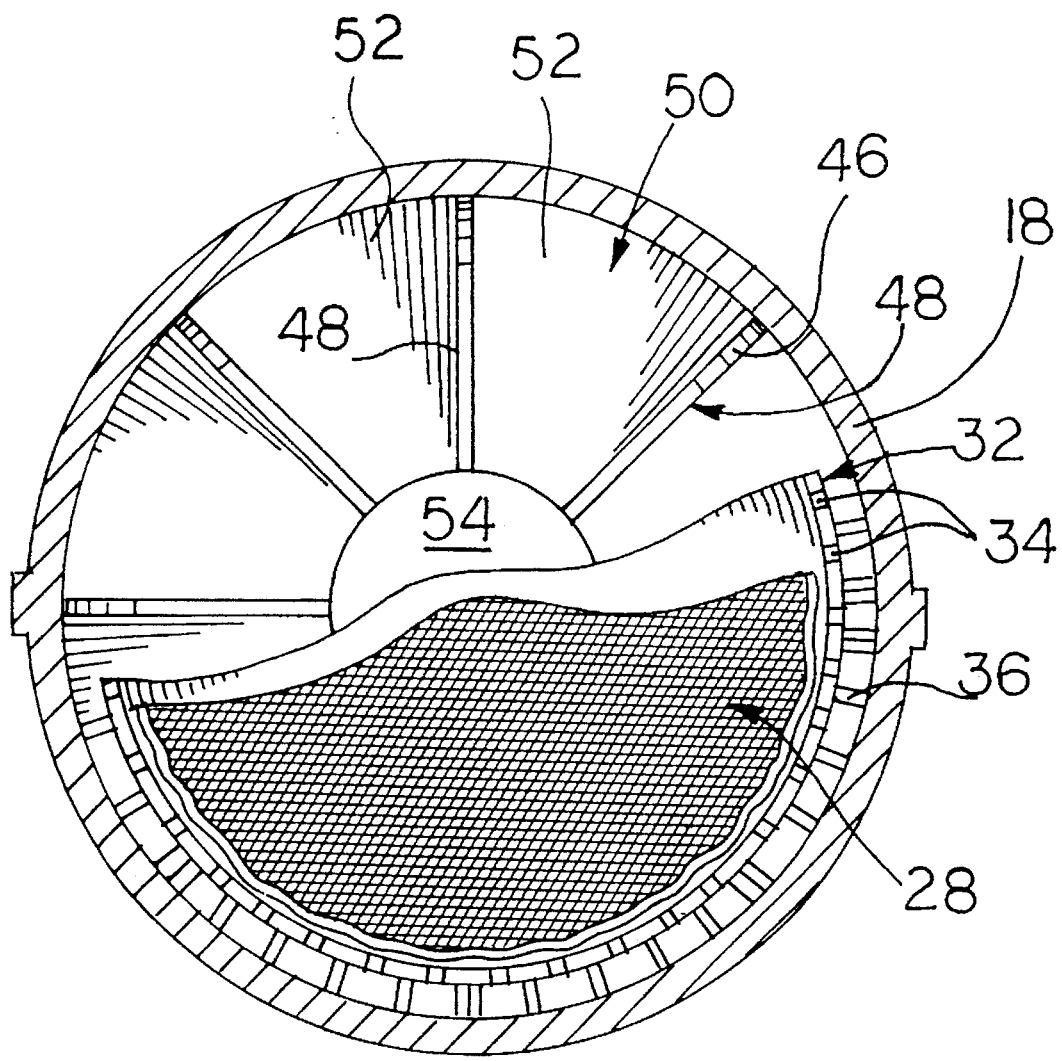
FIG. 4 is a view taken substantially along lines 4—4 of FIG. 2.

Referring now to the drawings, a filtering device generally indicated by the numeral 10 includes a vessel 12 having a removable lid 14 which is received on the open upper end of the vessel and is secured thereto by threads 16. The vessel 12 includes a circumferentially extending wall 18 which defines a chamber 20 therewithin. Wall 18 terminates in a closed end 22, and an outlet 24 is provided in end 22 to communicate liquid from the chamber 20. A filtering bag generally indicated by the numeral 28 has an open upper end 30 which is supported within chamber 20 such that liquid flowing into inlet 26 is received in the open end 30 of the bag 28 and fills the cavity defined by the bag 28. The walls of the bag 28 are flexible and liquid permeable, with a pore size designed to retain particulants in excess of a predetermined size within the bag 28 while permitting the liquid to pass through the pores of the bag. The bag 28 is supported within a liner 32 which extends circumferentially around the bag 28 and also extends substantially parallel to the outer circumferential wall 18 of the vessel 12. The liner 32 includes spaced apertures 34 which permit fluid communicated through the bag 28 to pass through the liner 32. Radially outwardly extending solid projections 36 extend from the solid portion 38 of the liner 32 defined between the apertures 34. The projections 36 all are of a substantially identical length. The projections 36 engage the circumferentially extending wall 18, and thus assure that the liner 32 is spaced a predetermined distance from the wall 18. Accordingly, a passage 40 is defined around and between the projections 36, which permit liquid passing through the bag 28 and the liner 32 to drain toward the bottom wall 22 of the vessel 12 and then through the outlet 24. The apertures 34 and projections 36 are defined on a circumferentially extending wall 42 of the liner 32, which has a lower closed end 44 and an open upper end that receives the bag 28.

The lower wall 44 of liner 32 engages upper surfaces 46 of circumferentially spaced fins 48 which define a lower support generally indicated by the numeral 50 which is mounted on end 22 of the vessel 12 and which supports the liner 32 within the vessel. The fins 48 project generally upwardly viewing FIG. 2 from connecting portions 52 of the support 50 which extend between fins 48. Accordingly, the fins 48 cooperate with one another to define a passage communicated with an opening 54 in support 50 to provide a path through which liquid can communicate to the outlet 24 from the passage 40 defined between the projections 36. Accordingly, liquid passing through the bag 28 passes through apertures 34 and then through the passages 40 defined between the round and the projections 36 to the passages defined between the fins 48 and support 50, and then through the opening 54 to the outlet 24.

The lid 14 may be removed by unscrewing the threads 16, thereby giving access to the chamber 20 to permit removal of a used filtering bag 28 and installation of new one. Since the material filtered from the liquid remains in the bag, the bag 28 must be changed periodically. After the lid 14 is replaced, the vessel 12 is again filled with liquid and pressurized, so that filtration of the liquid occurs as it passes through the filtering bag 28. Liquid communicates through the bag 28, through the apertures 34 and liner 32, and then through the passages 40 defined around and between the projections 36, and finally through the passages defined between the fins 48 to the opening 54 finally to the outlet 24. Outward deflection of the liner 32 is prevented by the engagement of the projections 36 with the wall 18 of the vessel 12, thereby maintaining the passages 40 open and assuring the proper spacing between the liner and the wall.

I claim:

1. Filtering device for filtering a liquid comprising a vessel having a circumferentially-extending wall defining a chamber therewithin, said vessel having an inlet and an outlet communicating with said chamber, a flexible, liquid permeable filtering bag suspended within said chamber, said filtering bag defining a cavity for receiving said liquid from the inlet, said liquid being filtered by passing through said bag, and a porous, rigid liner within said chamber for supporting said bag away from said wall, said liner cooperating with said wall to establish a clearance defining passage means for communicating liquid to said outlet after liquid has passed through the bag and the liner, said clearance being established projections carried by said liner and extending outwardly from the outer circumferential surface of the liner to engage said circumferentially-extending wall of the vessel, said liner including a solid portion defining an inner circumferential surface which engages and supports said bag, said solid portion defining apertures extending through the liner, said projections extending from said solid portion, each of said projections being separated from adjacent projections by said apertures, said projections being solid members cooperating with one another to define said passage means.

2. Filtering device as claimed in claim 1, wherein said bag has an open end and a closed end, said open end being supported within said vessel for receiving liquid from said inlet, said liner having an end supporting said closed end of the bag.

3. Filtering device as claimed in claim 1, wherein said vessel has an end cooperating with an end of the liner to define a compartment therebetween, and a support in said compartment for supporting the end of the liner away from the end of the vessel, said support having channels cooperating with said passage means for receiving liquid from the passage means.

4. Filtering device as claimed in claim 3, wherein said channels are defined between circumferentially spaced fins on said support, said fins engaging the end of the liner to support the latter.

5. Filtering device as claimed in claim 3, wherein said outlet extends through the end of said vessel, said support having an opening communicating with said outlet and with said channels whereby liquid communicates from said passage means through said channels and said opening to said outlet.

6. Filtering device as claimed in claim 1, wherein said bag has an open end and a closed end, said open end being supported within said vessel for receiving liquid from said inlet, said liner having an end supporting said closed end of the bag.

7. Filtering device as claimed in claim 6, wherein said vessel has an end cooperating with the end of the liner supporting said bag to define a compartment therebetween, and a support in said compartment for supporting the end of the liner away from the end of the vessel, said support having channels cooperating with said passage means for receiving liquid from the passage means.

8. Filtering device as claimed in claim 7, wherein said channels are defined between circumferentially spaced fins on said support, said fins engaging the end of the liner to support the latter.

\* \* \* \* \*